Figure 1:
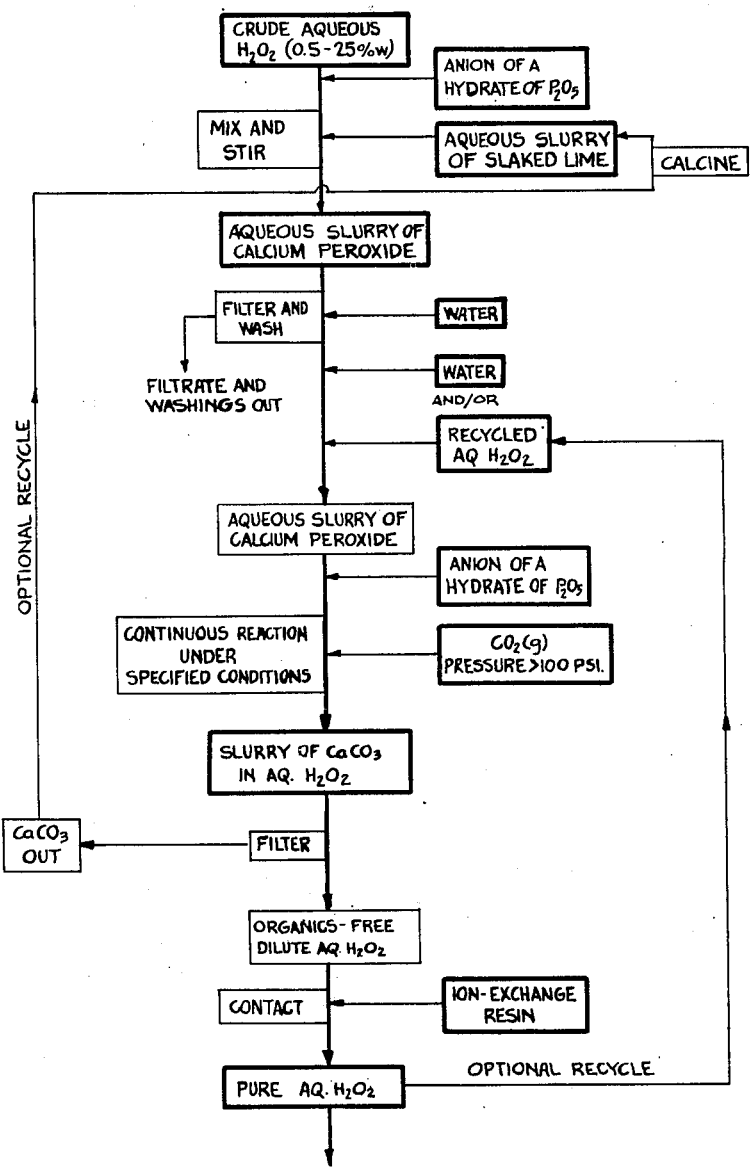

Inventors: Arthur K. Dunlop
Donald R. Douslin
Gino J. Pierotti

By: Alan C. Batchelder.
Their Agent

Nov. 23, 1954 A. K. DUNLOP ET AL 2,695,217
PURIFICATION OF HYDROGEN PEROXIDE
Filed May 22, 1952 3 Sheets-Sheet 3

Inventors: Arthur K. Dunlop
Donald R. Douslin
Gino J. Pierotti
By: Alan C. Batchelder
Their Agent

United States Patent Office 2,695,217
Patented Nov. 23, 1954

2,695,217

PURIFICATION OF HYDROGEN PEROXIDE

Arthur K. Dunlop, Berkeley, and Donald R. Douslin and Gino J. Pierotti, El Cerrito, Calif., assignors to Shell Development Company, Emeryville, Calif., a corporation of Delaware Application May 22, 1952, Serial No. 289,336

13 Claims. (Cl. 23—207)

Introduction

This invention relates to a process for the purification of aqueous hydrogen peroxide and it more particularly relates to a process for the preparation of pure aqueous hydrogen peroxide from aqueous hydrogen peroxide contaminated by small amounts of water-soluble organic impurities. Still more particularly the invention relates to an improved process for the purification of aqueous hydrogen peroxide wherein the hydrogen peroxide is converted in an initial step to calcium peroxide by reaction with hydrated lime, and is regenerated in a subsequent step by reaction of the separated calcium peroxide suspended in an aqueous medium with carbon dioxide.

As one of its important features the invention provides a continuous process for the purification of aqueous hydrogen peroxide utilizing the above-outlined principles and in addition thereto novel principles as set forth in detail hereinafter. Another important feature of the invention resides in the provision of a process of the above-defined character which leads to high yields of purified hydrogen peroxide when conducted with commercial limes containing appreciable quantities of ferriferous impurities. Still another important feature of the invention resides in a novel method for effecting reaction between calcium peroxide and carbon dioxide in the presence of ferriferous impurities, whereby hydrogen peroxide is generated in high yields and without significant decomposition from calcium peroxide containing ferriferous impurities which otherwise would promote decomposition of the hydrogen peroxide. An ancillary feature of the invention is certain improvements pertaining to the precipitation of calcium peroxide by reaction between aqueous hydrogen peroxide and hydrated lime. Other aspects of the invention will become apparent from the nature of the disclosures and claims hereinafter.

There have been proposed certain processes for the production of hydrogen peroxide by partial oxidation of organic intermediates. For example, hydrogen peroxide can be produced by vapor-phase partial oxidation of normally gaseous paraffin hydrocarbons according to the method of the Lacomblé Patent, U. S. 2,376,257. Other organic intermediates which may be used according to known processes include selected hydroaromatic hydrocarbons, such as 1,4-dihydrobenzene, quinhydrones, such as 2-ethylanthraquinhydrone, and suitable hydrazo compounds, for example, p-hydrazotoluene. In the foregoing and similar processes there is produced a crude oxidation product containing in addition to the hydrogen peroxide one or more organic products formed by the partial oxidation of the organic intermediate and also any unconsumed organic intermediate. The hydrogen peroxide contained in the crude oxidation product customarily is recovered in the form of an aqueous solution of hydrogen peroxide, as by quenching, scrubbing, extracting, or washing the crude oxidation product with water or by distilling the crude oxidation product in the presence of water.

The production of commercially acceptable aqueous hydrogen peroxide on a technical scale by the partial oxidation of organic intermediates has had certain drawbacks, an important one being the problem of freeing the aqueous hydrogen peroxide of volatile water-soluble organic impurities. The organic impurities may be present as residual amounts of the organic intermediate or of the organic product which is formed by its partial oxidation. There may be present organic by-products formed in small amounts during the oxidation of the organic intermediate. Where the oxidation process is one conducted in the presence of an organic solvent, small amounts of the organic solvent or its oxidation product may remain in the aqueous hydrogen peroxide which is produced. The organic impurities may or may not be reactive with hydrogen peroxide, and they may affect adversely one or more of the stability, color, or other properties of the aqueous hydrogen peroxide as initially recovered from the oxidation process. The problem of obtaining an adequately pure product is particularly acute when the aqueous hydrogen peroxide is initially obtained at a concentration of, say, below 30% by weight, and is to be concentrated to a higher concentration, such as the 50% hydrogen peroxide used in various commercial applications or the 90% hydrogen peroxide useful for military purposes as well as in special industrial applications. The presence of even small amounts of organic impurities may lead to detonatable mixtures during concentration by distillatory techniques, or to excessive decomposition of the hydrogen peroxide. For certain uses of the concentrated hydrogen peroxide, such as the generation of power by catalyzed decomposition of the hydrogen peroxide, the presence of even traces of organic impurities is objectionable. The removal of the last traces of organic impurities from aqueous hydrogen peroxide contaminated by such impurities heretofore has been particularly difficult to accomplish. There is need, therefore, for a process which can be operated on a large scale efficiently and at low cost, which utilizes practically obtainable starting materials, and which leads to complete removal of even trace amounts of water-soluble organic impurities from aqueous hydrogen peroxide containing such impurities.

Objects of the invention

A primary object of this invention, therefore, is a practical process for the purification of aqueous hydrogen peroxide contaminated by water-soluble impurities, particularly water-soluble organic impurities. A continuous process therefor, adapted to large-scale operations, is a further important object of the invention. Another important object is a process for purifying solutions of hydrogen peroxide containing organic impurities without the risk of explosion which may be present in methods based upon distillation.

A practical process for the purification of hydrogen peroxide via precipitation as calcium peroxide hydrate and regeneration of hydrogen peroxide from the calcium peroxide hydrate forms another important object of the invention. A highly important object is such a process which will enable the utilization of practical grades of lime while at the same time providing high yields of recovered hydrogen peroxide. An ancillary object of the invention is an improved method for the precipitation of calcium peroxide hydrate by reaction between hydrogen peroxide and hydrated lime.

Another highly important object of the invention is a method and reaction conditions for obtaining high yields of hydrogen peroxide by reaction between calcium peroxide and carbon dioxide when the reaction is carried out in the presence of ferriferous impurities, such as the ferriferous impurities normally contained in calcium peroxide hydrate which has been prepared from hydrogen peroxide and hydrated lime which contains iron.

Other objects of the invention will be apparent from the nature of the following disclosures and the appended claims.

General statement of the invention

It has been found in accordance with the invention that the objects of the invention can be accomplished by the process for purifying hydrogen peroxide which forms the subject matter of this invention. The combined process of the invention comprises a process for purifying hydrogen peroxide by converting hydrogen peroxide to calcium peroxide hydrate by reaction with hydrated lime and thereafter regenerating hydrogen peroxide from the separated precipitate by reaction with carbon dioxide under controlled carefully defined conditions. The combined process of the invention conveniently may be considered to comprise two principal inter-related steps. In the first principal step a slurry of hydrated lime in water is mixed with the crude aqueous hydrogen peroxide to form calcium peroxide hydrate by reaction between the hydrated lime and the hydrogen peroxide. As the lime slurry there may be used an aqueous slurry of hydrated calcined limestone or of other hydrated calcined naturally-occurring mineral having a high content of calcium carbonate. The reaction between the hydrated lime and the hydrogen peroxide advantageously is carried out in the presence of a small amount of added phosphate ion as explained more fully hereinafter. In the second principal step the separated and washed solid calcium peroxide hydrate is suspended in water or in recycled aqueous hydrogen peroxide solution and the resulting aqueous suspension or slurry of the calcium peroxide hydrate is treated with gaseous carbon dioxide to generate hydrogen peroxide and to form calcium carbonate. As one of the important features of the invention, the generation of hydrogen peroxide from the calcium peroxide hydrate is carried out under carefully defined, critical conditions of continuous operation under which substantially quantitative conversion of the calcium peroxide is obtained while at the same time decomposition of hydrogen peroxide by ferriferous impurities carried over from the hydrated lime employed in the first principal step is precluded. Calcium carbonate is removed from the resulting slurry, leaving a dilute aqueous solution of hydrogen peroxide. It is characteristic of this process that appreciable but small quantities of the iron initially present in the lime may be contained in solution in this dilute aqueous solution of hydrogen peroxide, at least in part as the complex ion $[FeOOH]^{++}$. According to the invention the iron as well as the traces of calcium which may remain in the solution may be removed in a finishing treatment by contacting the solution with a suitable cation-exchange resin. The resulting pure dilute solution of hydrogen peroxide may if desired be concentrated by conventional methods, such as fractional distillation, to any desired degree of concentration.

The process of the present invention may be applied to the purification of any aqueous solution of hydrogen peroxide containing in solution impurities which do not react with hydrated lime to form water-insoluble reaction products that in turn are solubilized by the action of carbon dioxide. Typical impurities which may be removed by the process of the invention include hydrocarbons; aldehydes and ketones, such as aldehydes and ketones of the aliphatic series as well as aldehydes and ketones of the cyclic variety; alcohols, such as the lower monohydric alcohols and the lower polyhydric alcohols of the aliphatic series; esters, such as carboxylic esters and esters of mineral acids; organic acids, such as the lower acids of the acetic acid series; amines, such as alkyl amines and analogs thereof; mineral acids; and salts, including both salts of the organic and salts of the inorganic varieties. Although not limited thereto, the process is of particular value for the separation from hydrogen peroxide of relatively volatile impurities, especially organic impurities, having volatilities which hinder their efficient removal by known methods, such as distillation. The process of the invention may be applied as the only purification treatment or it may be employed in conjunction with or in addition to other, known methods for the purification of hydrogen peroxide. For example, aqueous hydrogen peroxide containing large amounts of organic materials or other impurities may be preliminarily treated as by fractional distillation, extraction, or other known methods to remove the greater portion of the organic materials and the hydrogen peroxide may be freed of the remaining amounts of the organic materials by the process of the present invention. The aqueous solution of hydrogen peroxide which is obtained by the process of the present invention may be used as such, for example as a chemical intermediate useful for the preparation of organic peroxides, as a hydroxylating agent for the hydroxylation of unsaturated organic compounds, and the like, or it may be concentrated by known methods, such as fractional distillation, to obtain more highly concentrated solutions of hydrogen peroxide useful, for example, as bleaching agents in the treatment of paper stock, textiles, and the like, as polymerization catalysts, etc. Because of its freedom from organic impurities, hydrogen peroxide purified by the process of the invention and concentrated to 85% or higher concentration is useful as a source of power, for example, in rocket and other repulsion engines, power plants for submarines, and like applications of military and potential commercial importance.

In the accompanying drawings, Figure 1 represents a flow diagram showing schematically the combined process of the invention.

Figure 2:
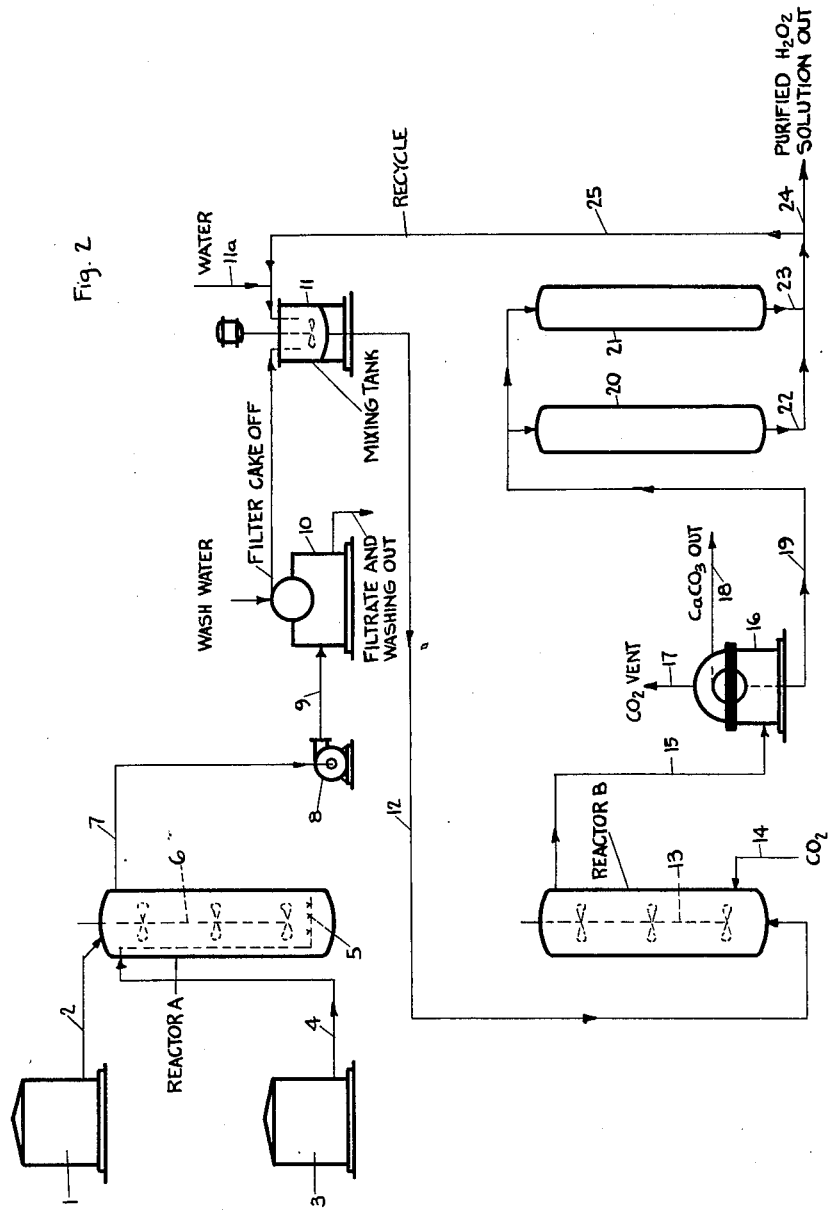

Figure 2 represents a flow diagram of a specific embodiment of the combined process of the invention applied to the continuous purification of aqueous hydrogen peroxide in the amount of 10 tons of $H_2O_2$ per day.

Figure 3:
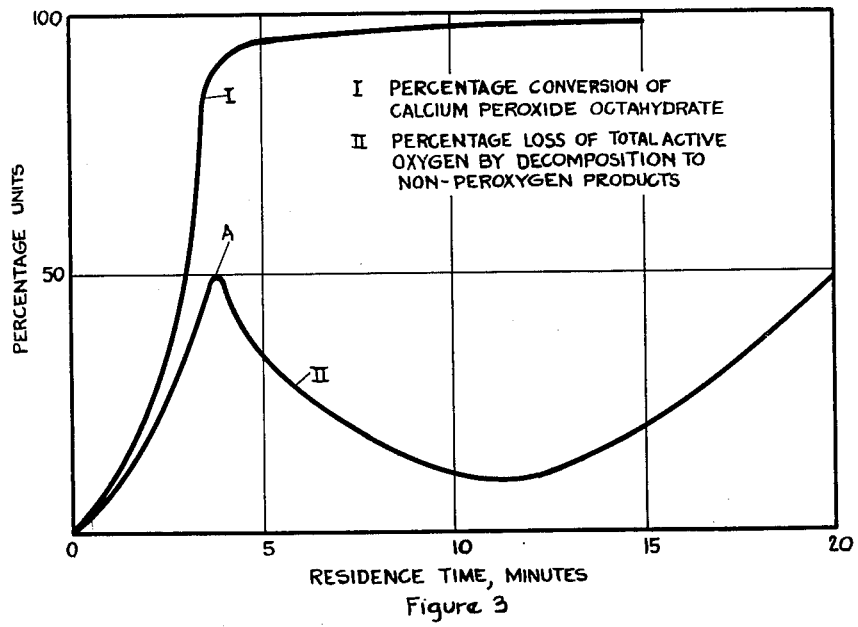
Figure 4:
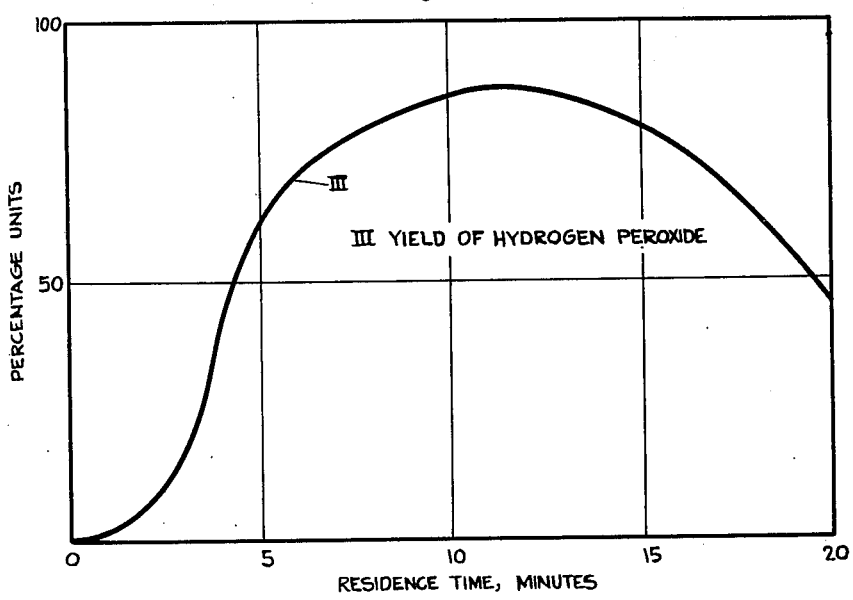

Figures 3 and 4 together represent diagrams which are presented for the purpose of elucidating certain of the principles upon which the second principal step of the combined process of the invention is based.

*More detailed description of the process*

The more detailed description of the combined process of the invention may be presented with reference to Figure 1 of the accompanying drawings, wherein there is shown a schematic flow diagram of the process.

*a.* PRECIPITATION OF THE CALCIUM PEROXIDE

There is at hand a crude aqueous solution of hydrogen peroxide which is to be purified according to the invention. The crude solution may have been prepared by partial oxidation of, for example, propane or other normally gaseous paraffin hydrocarbon, isopropyl alcohol or other secondary alcohol, 2-ethylanthraquinhydrone or like reduced quinone, or of other suitable organic intermediate. The immediate product of the oxidation process ordinarily will have been preliminarily treated, as by distillation, by extraction with water-immiscible organic solvents, by fractional condensation, by quenching with water, by extraction with water, or other appropriate means, so as to separate from the hydrogen peroxide the major proportion of the organic intermediate or its partial oxidation product, organic solvent, and other organic materials contained in the oxidation product. A typical feed to the process of the invention may be aqueous hydrogen peroxide containing from about 0.5% to about 25% by weight of $H_2O_2$ and water-soluble organic impurities ranging in amount from 5% to 100% by weight or more of the $H_2O_2$. The preferred feeds to the process contain from about 1% to about 10% by weight of $H_2O_2$. More highly concentrated feeds desirably are diluted with sufficient water to bring their concentration to within this preferred range.

In accordance with a preferred feature of the invention the conversion of the hydrogen peroxide to calcium peroxide is effected in the presence of a small amount, based upon the hydrogen peroxide, of a phosphate ion. The phosphate ion may be introduced by addition of a phosphate ion progenitor to the feed to the process, such as a water-soluble salt, e. g., an alkali metal salt, of a suitable mineral oxy-acid of phosphorus or the mineral oxy-acid of phosphorus per se. Phosphate ion may already be present in the crude aqueous hydrogen peroxide solution, in which case the amount of phosphate ion progenitor to be added will be adjusted accordingly. The term "a phosphate ion" is employed to include generically the anions of orthophosphoric acid as well as the anions of the lower hydrates of $P_2O_5$ than $H_3PO_4$, including the anions of pyrophosphoric acid, triphosphoric acid, tetraphosphoric acid, and metaphosphoric acid. Phosphate ion progenitors which may be added are ionizable compounds which yield a phosphate ion upon solution in water and include, among others, trisodium phosphate, potassium dihydrogen phosphate, disodium monohydrogen phosphate, orthophosphoric acid, sodium pyrophosphate, dipotassium dihydrogen pyrophosphate, pyrophosphoric acid, lithium pyrophosphate, sodium metaphosphate, and the like. The amount of the phosphate ion expressed as $PO_4$ may be within the range of from about 0.01% to about 10% by weight of the hydrogen peroxide contained in the crude solution, and preferably within the range of from about 0.2% to about 5% by weight thereof.

The function of the added phosphate ion appears to be two-fold.

Firstly, it has been discovered that by conducting reaction between the crude aqueous hydrogen peroxide and the aqueous slurry or suspension of lime in the presence of a small amount of phosphate ion, the physical characteristics of the solid calcium peroxide are greatly improved from the standpoint of subsequent filtration, washing, etc. When formed in the presence of the above-defined small amounts of added phosphate ion the calcium peroxide is a granular, porous, readily filterable and easily washable solid, whereas when the precipitation of the calcium peroxide is carried out without prior addition of a phosphate ion there is formed a finely divided almost colloidal solid which compacts, tends to clog the filter cloth, and is otherwise difficult to filter and to wash. Although it is not intended to limit the invention according to any theory, it is believed that the beneficial effects of the added phosphate ion are attributable in part to co-precipitation of a water-insoluble calcium salt of the mineral oxy-acid of phosphorus with the calcium peroxide and in part to flocculation of colloidably suspended precipitate by the effect of the ionic charge of the phosphate ion.

Secondly, it has been found that even higher yields of recovered hydrogen peroxide are obtained according to the process of the invention when the precipitation of the calcium peroxide is carried out in the presence of a small amount of phosphate ion than the already improved yields which are obtained when the process is carried out without the addition of phosphate ion.

The precipitation of the calcium peroxide is carried out by mixing together the crude aqueous solution of hydrogen peroxide and an aqueous slurry of hydrated lime. One of the important and distinctive advantages of the process of the invention is that there can be employed the cheap relatively impure commercial limes, produced by calcination of limestones and related naturally occurring calcium carbonates, without sacrifice in yield of recovered purified hydrogen peroxide compared to the yields heretofore obtainable only with chemically pure calcium hydroxide. There can be employed according to the invention commercial limes prepared by calcination of any naturally occurring mineral deposit containing upwards from 40% of calcium carbonate, such as limestone, marble, shell deposits, and the like. Lime prepared from these naturally occurring sources is in general characterized by the presence of ferriferous impurities in amounts ranging from about 0.01% to as much as 1% or more of iron expressed as per cent Fe based upon the total weight of the lime, and magnesium in amounts ranging from traces to as much as 25% or more expressed as per cent Mg based upon the total weight of the lime. When limes containing ferriferous impurities are employed in the processes hitherto known for the precipitation of hydrogen peroxide as calcium peroxide and subsequent regeneration of hydrogen peroxide from the resulting calcium peroxide, prohibitive losses of hydrogen peroxide, to as much as 75% or more, are encountered, apparently as a result of action of the iron compounds as catalysts for the decomposition of the hydrogen peroxide. The process of the present invention avoids, obviates, or inhibits this catalytic action of iron present in commercial grades of lime. In making possible the use of such commercial grades of lime the invention provides a process which is applicable at low cost on a large scale whereas the processes hitherto known were limited to fields of but academic interest due to the necessity for employing highly purified essentially laboratory grades of calcium hydroxide.

The aqueous slurry of lime may be prepared by adding lime to the requisite amount of water or by mixing previously slaked lime with water. Slurries containing from about 1% to 25% by weight or more of hydrated lime expressed as CaO may be employed. The slurry preferably contains from about 3% to not over about 15% by weight of hydrated lime expressed as CaO. The amount of the slurry of hydrated lime should provide a moderate stoichiometric excess of the hydrated lime based upon the amount of active or peroxy oxygen contained in the crude solution of hydrogen peroxide. The best results have been obtained by employing an about 5 to 10% stoichiometric excess of the slurry of hydrated lime. Use of less than the stoichiometric quantity of lime, based upon the content of active oxygen in the crude solution will lead to incomplete precipitation of the active oxygen as calcium peroxide. Stoichiometric excesses of lime greater than about 20% are less desirable than smaller excesses because the resulting solid calcium peroxide tends to be less readily filterable and to be difficult to free of entrapped water and occluded impurities.

The conversion of the hydrogen peroxide to calcium peroxide is carried out by mixing the slurry of hydrated lime and the crude aqueous hydrogen peroxide, preferably with vigorous agitation. Although the invention is not limited according to the order of mixing, for best results the time of contact of free hydrogen peroxide with suspended solids is minimized, for example, by adding the crude hydrogen peroxide solution to the slurry of hydrated lime rather than vice versa. The precipitation can be carried out most advantageously by feeding continuous separate streams of the lime slurry and of the crude aqueous hydrogen peroxide solution in the requisite proportions to a confined reaction zone wherein they are thoroughly and continuously mixed and continuously withdrawing resulting suspension of calcium peroxide from the reactor. The precipitation may be carried out in one or in a plurality of stages. The flow of the reactant solutions to the separate stages may be in series through the several stages, or portions of one or both of the reactant solutions may be fed separately to one or more of the individual stages.

The conversion of the hydrogen peroxide to calcium peroxide may be carried out at temperatures within the range of from about 0° C. up to 40° C. or more, the preferred temperatures being between 0° C. and 20° C. The reaction between the suspended hydrated lime and the hydrogen peroxide is relatively rapid; reaction times in the order of 3 to 10 minutes have been found to be adequate for essentially complete conversion of the hydrogen peroxide to calcium peroxide.

The precipitated calcium peroxide is separated from the mother liquor as by filtration or centrifugation, and washed with water to remove adhering mother liquor. The filtration or centrifugation can be carried out in conventional equipment. The washing of the solid calcium peroxide after separation from the mother liquor may be carried out in situ at the filter or centrifuge or the separated calcium peroxide may be suspended in a quantity of water and separated from the suspension by further filtration, centrifugation, or the like.

*b. REGENERATION OF THE HYDROGEN PEROXIDE*

For regeneration of the hydrogen peroxide according to the invention the separated and washed solid calcium peroxide is suspended in water or in recycled pure aqueous hydrogen peroxide solution and is converted by reaction with carbon dioxide under controlled and carefully defined conditions of continuous operation to hydrogen peroxide and calcium carbonate. The solid calcium peroxide produced under the conditions used in the first principal step of the process of the invention contains water of hydration approximately equivalent in amount to the formula $CaO_2 \cdot 8H_2O$. Solid calcium peroxide octahydrate theoretically will yield a 21.2% by weight aqueous solution of hydrogen peroxide upon reaction with $CO_2$ according to the equation

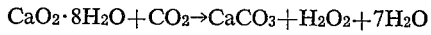

$$CaO_2 \cdot 8H_2O + CO_2 \rightarrow CaCO_3 + H_2O_2 + 7H_2O$$

A 50% by weight slurry of calcium peroxide octahydrate in water theoretically will yield a 9.04% by weight solution of hydrogen peroxide. For the preparation of hydrogen peroxide solutions at concentrations above those practicably obtainable from slurries of calcium peroxide octahydrate in water there may be substituted for the water in whole or in part aqueous hydrogen peroxide recycled from a subsequent step of the process. Less desirably, there may be employed elevated temperatures, such as between about 70° C. and 80° C., at which there is less water of crystallization associated with calcium peroxide and more concentrated (in terms of $CaO_2$ content) yet still pumpable slurries can be prepared. For example, a 50% slurry of $CaO_2 \cdot 2H_2O$ in water yields a 21.3% solution of hydrogen peroxide in water upon complete conversion of the calcium peroxide to $H_2O_2$ and $CaCO_3$ by reaction with $CO_2$.

The regeneration of hydrogen peroxide desirably is carried out in the presence of a small amount of phosphate ion progenitor added to the aqueous suspension or slurry of washed calcium peroxide hydrate. There preferably is added to the slurry from about 0.01% to about 2% by weight based upon the calcium peroxide expressed as hydrogen peroxide, of a phosphate ion progenitor, for example, sodium pyrophosphate or other phospate ion progenitor as hereinbefore disclosed, in aqueous solution.

The reaction between the calcium peroxide and the $CO_2$ is effected according to the invention by introducing a continuous stream of a slurry of calcium peroxide in water or in aqueous hydrogen peroxide having a concentration of hydrogen peroxide up to about 20% by weight, into a confined reaction zone wherein there is maintained a temperature of from 30° C. to 80° C., preferably from 40° C. to 65° C. and a carbon dioxide pressure greater than 100 pounds per square inch, continuously reacting the carbon dioxide and the suspension of calcium peroxide in said reaction zone, and continuously withdrawing from the reaction zone a separate stream comprising a slurry of calcium carbonate in aqueous hydrogen peroxide solution. The slurry of calcium peroxide which is introduced into the reaction zone may have a solids content of from about 1% to 60% or more by weight, and preferably between about 10% and about 45% by weight. The carbon dioxide pressure is maintained by introduction of carbon dioxide at a substantially constant pressure within the range of from about 100 to about 1000 pounds per square inch and preferably within the range of from about 200 and about 500 pounds per square inch. The residence time of the slurry in the confined reaction zone may be defined as the quotient obtained by dividing the volume of slurry in the reaction zone under steady-state operating conditions by the rate of input of liquid feed to the reaction zone, consistent units naturally being used. The residence times may be varied over the range of from about one-half minute to not over about 20 minutes, depending upon the reaction temperature and the carbon dioxide pressure. Under the preferred conditions residence times from about one minute to not over about 10 minutes are employed. For any given reaction temperature and carbon dioxide pressure, however, the residence time must be adjusted to within narrow, well-defined limits.

By effecting the regeneration of the hydrogen peroxide at temperatures and carbon dioxide pressures within the above-defined ranges, and by adjusting the residence time to within criitical predetermined ranges according to the reaction temperature and the carbon dioxide pressure, decomposition of the hydrogen peroxide by catalytic action of the ferriferous impurities carried over from the lime used in the first principal step of the process is for practical purposes precluded. For each temperature and carbon dioxide pressure within the above defined ranges there is a critical range of reaction times within which the extent of decomposition of active oxygen varies inversely with the reaction time. Within this critical range of reaction times the yield of hydrogen peroxide, based upon the calcium peroxide consumed, increases with increasing residence time. Expressed otherwise, there is for each reaction temperature at the above-defined carbon dioxide pressures a critical minimum reaction time. At reaction times shorter than this critical minimum time calcium peroxide is consumed but the consumed calcium peroxide is converted almost wholly to non-peroxygen products. With increase in the reaction time from such shorter reaction times the percentage decomposition of the active oxygen to non-peroxygen products has been found to pass through a maximum and then to actually decrease with further increase in the reaction time. By operating within limited critical ranges of residence times, longer than the residence time at which said maximum occurs, there are obtained in accordance with the invention practical conversions of the calcium peroxide and yields of hydrogen peroxide exceeding 90% of theory, the presence of ferriferous impurities notwithstanding.

The minimum residence time which is employed in accordance with the invention varies from about ½ minute to about 6 minutes depending upon the reaction temperature and the carbon dioxide pressure. The length of the minimum residence time is an inverse function of the reaction temperature at constant carbon dioxide pressure. At carbon dioxide pressures within the range of from about 100 to about 200 pounds per square inch the minimum residence time is an inverse function of the carbon dioxide pressure at constant temperatures. At carbon dioxide pressures above about 200 pounds per square inch the minimum residence time is determined primarily by the reaction temperature. The maximum residence time which is employed is determined in part by the minimum suitable residence time under the operating conditions of temperature and carbon dioxide pressure. The residence time should be limited to a maximum of 6 times the length of the minimum residence time suitable at the operating conditions of temperature and carbon dioxide pressure and desirably is limited to a time not in excess of about 20 minutes.

The regeneration of hydrogen peroxide from the calcium peroxide may be carried out in any conventional reactor adapted to continuous operation and designed to afford intimate contact between the gaseous carbon dioxide and the aqueous slurry of calcium peroxide. One type of suitable reactor comprises a pressure-resistant closed vessel provided with inlets and outlets for the slurry and the $CO_2$ gas. The $CO_2$ gas may be introduced under pressure through a suitable nozzle or other dispersing means near the bottom of the vessel, passed upwardly through the liquid contained in the vessel, and withdrawn near the top of the vessel and discharged through any suitable valving means adapted to maintain a substantially constant desired pressure within the vessel. Means for controlling the temperature and the rates of feed and effluence obviously will be provided. The reaction mixture within the reaction zone should be vigorously stirred, as by a power-driven stirrer, and the $CO_2$ gas advantageously may be introduced in a plurality of jets so as to facilitate intimate, rapid, and thorough contact between the slurry and the $CO_2$ gas. The reactor may be provided with interiorly located baffles or equivalent means which, with appropriate location of the inlet and outlet for liquid feed and liquid effluent, respectively, afford generally countercurrent flow between the liquid slurry and $CO_2$ gas. Other types of reactors may be employed, however. For example, the slurry may be percolated downwardly through a packed tower in countercurrent flow to $CO_2$ gas under pressure rising therethrough, or an excess of $CO_2$ gas and the calcium peroxide slurry may be conveyed concurrently in turbulent flow through an elongated tube.

The slurry issuing from the reaction zone comprises solid calcium carbonate suspended in a solution comprising hydrogen peroxide, carbon dioxide, and small amounts of calcium bicarbonate in water. The suspended calcium carbonate may be separated as by centrifugation or filtration. Loss of carbon dioxide from the slurry during the centrifugation or filtration and from the filtrate should be minimized so as to prevent conversion of calcium bicarbonate to and consequent deposition of calcium carbonate. It is preferred to effect the separation by centrifugation under carbon dioxide pressure. Depending upon the intended use for the purified hydrogen peroxide, small amounts of HCl, $H_2SO_4$, $H_3PO_4$, or other strong mineral acid may be added to the filtrate to displace the combined $CO_2$ and thereby prevent precipitation of calcium carbonate and the adjusted solution may be withdrawn as the final product. For the production of high purity hydrogen peroxide suitable for use in repulsion engines and other applications requiring high purity, the filtrate preferably is conveyed directly to the finishing treatment without such addition of strong mineral acid.

c. THE FINISHING TREATMENT

In preparing high purity hydrogen peroxide according to the process of the invention the dilute aqueous solution of hydrogen peroxide produced in the second principal step of the process and remaining after removal of the solid calcium carbonate is contacted with a cation-exchange resin whereby metallic cations, such as residual calcium and iron, are removed from the solution.

Suitable cation-exchange resins which may be employed are the well-known synthetic resins containing free acid groups which are capable of abstracting alkali metal ions from solutions of alkali metal salts. The resin should, of course, be resistant to the action of dilute aqueous hydrogen peroxide solutions, and also resistant to the action of alkalies and of acid. One suitable type of cation-exchange resin contains the sulfonic acid group as the free acid group. This type is illustrated by sulfonated phenol-aldehyde resins, such as the phenolic methylene sulfonic resins sold by Rohm and Haas Company under the trade name Amberlite IR–100, Amberlite IR–120 and IR–105, the phenolic methylene sulfonic resin supplied by American Cyanamid Company under the trade name Ionac C–200, and the phenolic methylene sulfonic resin supplied by Dow Chemical Company under the trade name Dowex–50 resin. There also may be employed cation-exchange resins containing carboxyl as the acid group, such as salicyclic acid-phenol-formaldehyde condensation products or other resins prepared from substances containing the carboxyl group. Various methods for producing synthetic solid cation-exchange resins are known from patents and from the literature and need not be described in detail here.

In the finishing treatment the solution of hydrogen peroxide produced in the second principal step of the combined process of the invention is percolated through a bed of the cation-exchange resin in the hydrogen form, or otherwise contacted by known techniques with the resin, whereby trace amounts of calcium, iron, and any other metallic cations are removed from the solution. The resin, after exposure to an amount of the solution of hydrogen peroxide, is regenerated by washing with an aqueous solution of a non-reducing mineral acid, such as a 6 to 10% aqueous solution of HCl or $H_2SO_4$ until analysis of the washing shows, by decrease of the content of metal cations in the washings, that the absorbed metal cations have been desorbed from the resin. The resin then is washed with deionized water to remove the acid, with backwashing if desired, after which it may be contacted with a further quantity of the aqueous hydrogen peroxide solution.

The resulting hydrogen peroxide solution may be concentrated if desired by known methods, such as flashing and fractional condensation, rectification, or the like.

*Detailed example of the invention*

For purposes of illustration a specific example of the process of the invention is described with reference to Figure 2. Figure 2 represents a schematic flow diagram showing application of the process to continuous purification of ten tons per day of hydrogen peroxide supplied as a crude dilute aqueous solution. The flow diagram is drawn to no scale. Various pieces of accessory equipment, such as pumps, heat exchangers, etc., have been omitted from the drawing since they can be supplied as required for any specific installation by those skilled in the art. It will be understood, of course, that various modifications of the process specifically shown may be made without departure from the letter and spirit of the appended claims.

The two principal reactors are designated reactor A and reactor B, respectively. In reactor A hydrogen peroxide and hydrated lime are reacted to form calcium peroxide. In reactor B hydrogen peroxide is regenerated by reaction between the calcium peroxide and $CO_2$ gas. Reactor A conveniently may be a steel vessel equipped with an efficient power-driven stirrer. Reactor B may be a single vessel equipped with efficient power-driven stirrer, or it may be two or more smaller vessels arranged in parallel flow. Reactor B should be constructed of or lined with a material, such as glass, aluminum, selected stainless steels, tantalum, or the like, which is inert with respect to the reaction mixture.

The crude hydrogen peroxide solution to be purified by the process may have been prepared by partial oxidation in vapor phase of propane according to the process of the Lacomblé patent, U. S. 2,376,257, and may have a composition analyzing (weight basis) as follows:

| | Percent |
|---|---|
| $H_2O_2$ | 3–5 |
| Organic acids, chiefly $C_1$ to $C_3$ fatty acids | 0.1–0.4 |
| Alcohols, chiefly methanol | 1–2 |
| Aldehydes, chiefly $C_1$ to $C_3$ saturated aldehydes | 1–4 |
| Water | remainder |

The feed may have been prepared by partial oxidation in liquid phase of isopropyl alcohol and distilling off acetone and unconsumed isopropyl alcohol and may have a composition on a weight basis as follows:

| | Percent |
|---|---|
| Hydrogen peroxide | 6–10 |
| Alcohols | trace–2 |
| Aldehydes | trace–0.1 |
| Ketones | 0.1–2 |
| Water | remainder |

In the present example the feed contains 3.4% by weight $H_2O_2$ and about 1% by weight of the hydrogen peroxide of added sodium pyrophosphate. The feed is continuously pumped from the source, for example, reservoir 1, via conduit 2 into reactor A at the rate of 70 gallons per minute. Reactor A has a liquid capacity of 676 gallons and is maintained at about 10° C. by cooling means, not shown. A slurry of slaked lime prepared from a commercial lime containing about 10% magnesia, about 0.1% iron and from 1 to 5 parts per million of copper is continuously pumped into reactor A from reservoir 3 via conduit 4 and dispersing means 5 at the rate of 66 gallons per minute, the contents of the reactor being continuously and vigorously stirred by power-driven stirrer 6. An aqueous slurry of calcium peroxide is formed by the reaction of the slaked lime and the hydrogen peroxide. The slurry of calcium peroxide is continuously passed from reactor A via conduit 7, pump 8 and conduit 9 to filter 10. Filter 10 may be a continuously-operating rotary filter of conventional design, preferably constructed of stainless steel or other corrosion-resistant metal. On the filter the separated calcium peroxide is washed with about 1950 gallons of water per hour. The filtrate and washings are discarded or they may be taken to a suitable unit (not shown) for recovery of the organic materials.

There is obtained about 7400 pounds per hour of calcium peroxide octahydrate containing about 3400 pounds of water and about 489 pounds of $Ca(OH)_2$ plus magnesium hydroxide. The wet calcium peroxide octahydrate is transferred to mixing tank 11 wherein it is slurried in about 1340 gallons per hour of water containing sodium pyrophosphate decahydrate equivalent to 1% by weight of the equivalent $H_2O_2$ in the calcium peroxide, the water being introduced via inlet 11a, and the slurry is pumped continuously via conduit 12 to reactor B. In lieu of part or all of the water, aqueous hydrogen peroxide solution recycled via conduit 25 may be used in making up the slurry in mixing tank 11. Reactor B may be a glass-lined, stainless-steel, aluminum, or other suitable pressure resistant vessel equipped with a power-driven stirrer 13 and means (not shown) for controlling the temperature. Two or more vessels may be used, arranged in parallel. A carbon dioxide pressure of 300 pounds per square inch is maintained in reactor B by introduction of gaseous $CO_2$ through inlet 14 at a rate of about 2120 pounds per hour. In reactor B the carbon dioxide and the calcium peroxide react to form calcium carbonate and hydrogen peroxide. The reaction temperature is about 55° C. and the residence time of the slurry in the reactor is about four minutes.

The slurry of calcium carbonate in aqueous hydrogen peroxide, formed in reactor B, is conveyed under carbon dioxide pressure via conduit 15 to continuous centrifuge 16. The centrifugation may be carried out under about one atmosphere (absolute) of carbon dioxide pressure. Carbon dioxide is vented via vent 17. The separated calcium carbonate is washed with about 375 gallons of water per hour, and withdrawn from the centrifuge via 18. The withdrawn calcium carbonate may be calcined with added make-up limestone, and the lime recycled to the feed to reactor A. The combined liquid centrifugate and washings is an about 5% by weight aqueous solution of hydrogen peroxide containing from about 1000 to about 3000 parts per million of calcium and from about 1 to about 25 parts per million of iron. The liquid centrifugate is conveyed via conduit 19 to towers 20 and 21, wherein it is passed through a bed of acid-treated sulfonated polystyrene cation-exchange resin, such as the cation-exchange resin sold by Dow Chemical Company under the trade name Dowex–50 resin, the towers being arranged with conventional piping and valving (not shown) for successive on-stream, regeneration, washing, and backwashing cycles in phases alternating between the two towers.

Purified hydrogen peroxide solution is withdrawn from towers 20 and 21 via conduits 22 and 23, respectively, and may be taken thence via conduit 24, for example, to storage or to distillation units (not shown) for concentration. A portion of the purified solution may be recycled to mixing tank 11 for use in making up the feed to reactor B. Provision for such recycle is shown in conduit 25.

The purified aqueous solution of hydrogen peroxide obtained as the effluent from towers 20 and 21 is a useful product in itself. It may be stabilized by addition of conventional known stabilizers for hydrogen peroxide. If desired, the purified solution may be concentrated by known methods to obtain hydrogen peroxide at a desired concentration to and including 90% and higher concentrations. Methods for the concentration of dilute aqueous solutions of hydrogen peroxide, as by distillation, flashing and fractional condensation, etc., are well-known to those skilled in the art and need not be described in detail here.

The following table describes conditions illustrative of the invention and results typical of those which are obtained by practice of the invention.

converted largely to non-peroxygen products. This is shown by curve II (Figure 3), wherein it is seen that as

| Feed | | | First Principal Step | | | | | | Second Principal Step | | | | | Resin-Treated $H_2O_2$ Solution | |
|---|---|---|---|---|---|---|---|---|---|---|---|---|---|---|---|
| Crude $H_2O_2$ Solution a | Lime Slurry b | Mole Ratio, CaO/ $H_2O_2$ | Temp., °C. | Residence Time, Min. | $H_2O_2$ Conversion, Percent | $CaO_2$ Yield, Percent of Theory | Fe Content of $CaO_2 \cdot 8H_2O$, p. p. m. Fe | Temp., °C. | $CO_2$ Pressure, p. s. i. g. | Residence Time, Min. | Conversion of $CaO_2 \cdot 8H_2O$, Percent | Yield of $H_2O_2$, Percent | Conctn., Percent wt. $H_2O_2$ | Carbon, Percent wt. |
| B | I | 1.04 | 11 | 4 | 98.3 | 98.3 | ca. 70 | 40 | 200 | 3.1 | 97.9 | 92.7 | 4.7 | <0.002. |
| A | II | 1.20 | 10 | 8 | 100 | 96 | ca. 750 | 55 | 300 | 3.8 | 98 | c 91 | not treated. | Not treated. |
| A | III | 1.30 | 11 | 8 | 100 | 95 | ca. 200 | 40 | 200 | 4.2 | 94 | d 91 | not treated. | Not treated. |
| B | I | 1.04 | 11 | 4 | 100 | 97.7 | ca. 70 | 55 | 300 | 3.9 | 98.1 | 90.8 | 7.4 | <0.002. | a Compositions of the crude $H_2O_2$ solutions analyzed as follows:

| Component | Amount, percent wt. | |
|---|---|---|
| | Solution A | Solution B |
| $H_2O_2$ | 3.50 | 3.5 |
| Organic acids | 0.259 | ca. 0.2 |
| Alcohols | 1.87 | ca. 0.3 |
| Aldehydes | 2.11 | ca. 0.02 |
| Ketones | | ca. 0.3 |
| Sodium pyrophosphate | 0.035 | 0.035 |
| Water | remainder | remainder | b The slurries were prepared by suspending finely divided lime in water in an amount corresponding to 7% of CaO based upon the weight of the slurry. The limes employed in making up the respective slurries analyzed as follows:

| | Percent Wt. | | | P. p. m. | |
|---|---|---|---|---|---|
| | Ca | Mg | $CO_3$ | Fe | Cu |
| Lime I | 66.7 | 1.97 | 0.94 | 280 | 1.4 |
| Lime II | 37.8 | 22.5 | 0.87 | 3,000 | 5 |
| Lime III | 65.4 | 0.87 | 2.15 | 760 | 1.1 | c As 2.5% by weight aqueous solution.
d As 4.7% by weight aqueous soliution.

*Discussion of the generation of hydrogen peroxide from calcium peroxide according to the invention*

The continuous process which is provided by the present invention for the generation of hydrogen peroxide from carbon dioxide and calcium peroxide containing ferriferous impurities is based in part upon the discovery of certain critical and unexpected relationships between, on the one hand, the reaction temperature, the carbon dioxide pressure, and the residence, or reaction time, and on the other hand, the extent of conversion of the calcium peroxide and the yield of hydrogen peroxide. These relationships may be further explained with reference to Figures 3 and 4, which together are based upon the results of a series of experiments in which calcium peroxide octahydrate, prepared by treatment of a crude 3.5% aqueous solution of hydrogen peroxide with an aqueous slurry of a commercial lime containing about 700 parts of Fe per million parts of CaO, was suspended in water and the suspension passed at differing measured residence times through a confined reaction zone maintained at 40° C. under 100 pounds per square inch carbon dioxide pressure. Effluent from the reaction zone was collected and analyzed to ascertain the extent of conversion of the calcium peroxide octahydrate, the yield of hydrogen peroxide, and the loss of active oxygen by decomposition, all as functions of the residence time.

Curve I (Figure 3) shows the variation of the percentage conversion of the calcium peroxide octahydrate with variation of the residence time.

Curve II (Figure 3) shows the variation of the percentage loss of total active oxygen (i. e., the decomposition of active, or peroxide, oxygen to non-peroxy products) with variation of the residence time.

Curve III (Figure 4) shows the variation of the yield of hydrogen peroxide with the residence time.

It is seen from curve I that, as the residence time is increased from zero the extent of conversion of the calcium peroxide octahydrate to all other products increases more or less rapidly until at about four minutes residence time (under the conditions used in this series of experiments) about 95% of the calcium peroxide is consumed. With increase in the residence time to times longer than about four minutes only a gradual further increase in the extent of conversion of the calcium peroxide is obtained. In other words, the conversion of the calcium peroxide octahydrate is for practical purpose completed at about four minutes residence time under the conditions used in this series of experiments.

At low residence times, from 0 to about 4 minutes in this series of experiments, the active oxygen initially present as calcium peroxide octahydrate is shown to be the residence time is increased from zero the extent of decomposition of active oxygen initially increases more or less rapidly with increasing residence time. Most of the converted calcium peroxide octahydrate is converted at these low residence times to non-peroxygen products. This is reflected in the low yields of hydrogen peroxide shown by the corresponding portions of curve III (Figure 4).

Now it unexpectedly has been discovered in accordance with this invention that, at the reaction temperatures and carbon dioxide pressure contemplated in accordance with the invention, there is an abrupt change in the nature of the over-all reaction as the residence, or reaction time is increased to longer reaction times. This change is clearly shown by curve II, where it is shown that as the residence time is increased to above this initial, low range of residence times, the curve representing the extent of decomposition of active oxygen passes through an abrupt maximum (point A on curve II) and decreases with further increase in the residence time. As clearly shown by curve III, there is a corresponding rapid increase in the yield of hydrogen peroxide as the residence time is lengthened to times greater than the residence time at which this maximum in curve II occurs. From a comparison of curves I, II and III, it is clear that there is a limited, critical range of residence times within which both high conversions of calcium peroxide and high yields of hydrogen peroxide can be obtained. At residence times below this range there are obtained but low efficiencies due to the low conversion of calcium peroxide and the high losses of active oxygen by decomposition to non-peroxygen products. At times greater than this range, the high losses of hydrogen peroxide preclude efficient operation, the high conversions of calcium peroxide notwithstanding.

At the point of maximum decomposition of active oxygen (represented by point A on curve II) the slope of the curve which is obtained by plotting the percentage loss of total active oxygen by decomposition to non-peroxygen products vs. the residence time under otherwise constant conditions passes through zero from a positive slope to a negative slope. Expressed otherwise, at this point of maximum decomposition the numerical value of the differential represented by $dc/dt$ passes through zero from positive to negative values, $c$ being the percentage decomposition of active or peroxide oxygen at varying residence times $t$. It is characteristic of the process of this invention that the generation of hydrogen peroxide by reaction between the aqueous slurry of calcium peroxide containing ferriferous impurities and the carbon dioxide is carried out at residence times longer than the time at which the above-defined maximum in the extent of decomposition of active oxygen to non-peroxygen products occurs.

The actual time at which said maximum occurs is within limits dependent upon the reaction temperature and the carbon dioxide pressure contemplated according to the invention. The higher the temperature, the shorter the residence time at which said maximum occurs. For example, at 40° C. and 100 pounds per square inch carbon dioxide pressure the maximum occurs at about 4 minutes residence time, as shown in Figure 3. At 55° C. and about 300 pounds per square inch carbon dioxide pressure the maximum occurs at a residence time of about one minute. For other conditions of temperature and carbon dioxide pressure the residence time at which said maximum occurs is readily ascertainable by preliminary tests from which the residence time to be used under the given conditions may be predetermined.

From Figures 3 and 4 it will be seen that the residence time leading to maximum yields of hydrogen peroxide and to minimum decomposition of active oxygen to non-peroxygen products is considerably longer than the time required for substantially complete consumption of the calcium peroxide. Whereas, in the series of experiments described by Figures 3 and 4 conversion of the calcium peroxide was for practical purposes completed at a residence time of about 4 minutes, the maximum yield of hydrogen peroxide was realized at a residence time of about 12 minutes. According to a preferred embodiment of the invention, the generation of hydrogen peroxide by reaction between carbon dioxide and the aqueous slurry of calcium peroxide containing ferriferous impurities is carried out at a residence time between 2 and 6 times the residence time at which the slope represented by the above-defined differential $dc/dt$ changes from positive to negative values.

At residence times longer than the limited range of residence times which is contemplated in accordance with the invention there is encountered excessive decomposition of active oxygen and only low yields of hydrogen peroxide are obtainable. Thus, Figures 3 and 4 show that under the conditions of the experiments described therein the extent of decomposition of active oxygen to non-peroxygen products, expressed as percentage of the total active oxygen, exceeded the yield of hydrogen peroxide at a residence time of 20 minutes. In order to obtain practical yields of hydrogen peroxide the residence time should be limited to a time not exceeding 20 minutes and preferably is limited to a time not over 6 times the length of the time at which the above-defined differential $dc/dt$ passes through zero from positive to negative values.

It is not intended to restrict the invention according to any theory, expressed or implied. It may be stated, however, that the relationships, illustrated by Figures 3 and 4, between the reaction temperature, the carbon dioxide pressure, the residence or reaction time, and the yields of hydrogen peroxide and conversion of the calcium peroxide containing ferriferous impurities appear to result from the critical dependency of the course of reaction upon the particular reaction conditions used. For example, at low temperatures, such as temperatures between 0° C. and 10° C., treatment with carbon dioxide of aqueous slurries of calcium peroxide containing iron compounds as impurities has been found to result predominantly in decomposition of the active oxygen or peroxidic compounds to non-peroxygen products. At these low temperatures the course of the reaction or reactions is one which leads primarily to decomposition of active oxygen. Under the conditions used in the second principal step of the combined process of this invention a different course of reaction predominates, namely, the liberation of recoverable hydrogen peroxide accompanied by substantially complete suppression of the decomposition of active oxygen. By the selective control of the course of the reaction which is made possible by the present invention, high yields of hydrogen peroxide are obtained from calcium peroxide containing substantial quantities of ferriferous impurities, despite the normally high activity of such impurities as catalysts for the decomposition of peroxidic compounds.

We claim as our invention:

1. A continuous process for the purification of hydrogen peroxide which comprises: adding to an about 0.5% to 25% by weight impure aqueous solution of hydrogen peroxide from about 0.05% to about 10% by weight of the hydrogen peroxide of a phosphate ion progenitor; introducing the aqueous solution of hydrogen peroxide containing the phosphate ion progenitor and an aqueous suspension of hydrated lime into a first reaction zone wherein the hydrogen peroxide and the hydrated lime combine in the presence of the added phosphate ion progenitor to form solid calcium peroxide octahydrate; separating the solid calcium peroxide octahydrate from the mother liquor, slurrying the separated calcium peroxide octahydrate in water; passing a continuous stream of slurry of calcium peroxide octahydrate into a second reaction zone wherein there is maintained a substantially constant temperature between about 30° C. and about 80° C. and a substantially constant carbon dioxide pressure of at least 100 pounds per square inch for a predetermined time of residence within said zone greater than that certain residence time at which the numerical value of the differential $dc/dt$, $c$ being the percentage decomposition to non-peroxygen products of the active oxygen contained in the feed to said second reaction zone as the residence time, $t$, of the slurry in said second reaction zone is varied, passes through zero from positive to negative values, but not greater than about 6 times the length of said certain residence time; and withdrawing from said second reaction zone an aqueous slurry comprising solid calcium carbonate suspended in an aqueous solution of hydrogen peroxide.

2. A continuous process for the purification of hydrogen peroxide which comprises: adding to an about 0.5% to 25% by weight impure aqueous solution of hydrogen peroxide from about 0.05% to about 10% by weight of the hydrogen peroxide of a water-soluble ionizable compound which yields phosphate ion upon solution in water selected from the class consisting of the hydrates of $P_2O_5$ and the water-soluble mineral salts of said hydrates; introducing the aqueous solution of hydrogen peroxide containing said added water-soluble ionizable compound and an aqueous slurry of hydrated lime having an appreciable content of ferriferous impurities into a first reaction zone where the hydrogen peroxide and the hydrated lime combine in the presence of said added water-soluble ionizable compound to form solid calcium peroxide octahydrate; separating the solid calcium peroxide octahydrate from the mother liquor, forming an aqueous slurry of the separated solid calcium peroxide octahydrate; introducing a continuous stream of aqueous slurry of calcium peroxide octahydrate into a second reaction zone wherein there is maintained a substantially constant temperature between about 30° C. and about 80° C. and a substantially constant carbon dioxide pressure between about 100 and about 1000 pounds per square inch at a rate equivalent to a residence time greater than a minimum time varying inversely according to the temperature between about 6 minutes and about ½ minute, the 6-minute time applying at the limit defined by the lower of said temperatures and the ½-minute time applying at the limit defined by the higher of said temperatures, but for a residence time not greater than about 6 times the length of said minimum time; and withdrawing from said second residence zone an aqueous slurry of calcium carbonate in aqueous hydrogen peroxide solution.

3. A continuous process for the purification of hydrogen peroxide which comprises: adding to an about 0.5% to about 25% by weight impure aqueous solution of hydrogen peroxide from about 0.05% to about 10% by weight of the hydrogen peroxide of a phosphate ion progenitor; introducing the aqueous solution of hydrogen peroxide containing the phosphate ion progenitor and an aqueous suspension of hydrated lime into a first reaction zone wherein the hydrogen peroxide and the hydrated lime combine in the presence of the added phosphate ion progenitor to form solid calcium peroxide octahydrate; separating the solid calcium peroxide octahydrate from the mother liquor, slurrying the separated calcium peroxide octahydrate in one of the group consisting of water and aqueous solutions of hydrogen peroxide; passing a continuous stream of the slurry into a second reaction zone wherein there is maintained a substantially constant temperature between about 40° C. and about 65° C. and a substantially constant carbon dioxide pressure between about 200 and about 500 pounds per square inch for a predetermined time of residence within said second reaction zone greater than that certain residence time at which the numerical value of the differential $dc/dt$, $c$ being the percentage decomposition to non-peroxygen products of the active oxygen contained in the feed to said second reaction zone as the residence time, $t$, of the slurry therewithin is varied, passes through zero from positive to negative values, but not over about 20 minutes, and withdrawing from second reaction zone a slurry of solid calcium carbonate suspended in an aqueous solution of hydrogen peroxide.

4. A continuous process for the purification of hydrogen peroxide which comprises: adding to an about 0.5% to about 25% by weight impure aqueous solution of hydrogen peroxide from about 0.05% to about 10% by weight of the hydrogen peroxide of a phosphate ion progenitor; introducing the aqueous solution of hydrogen peroxide containing the phosphate ion progenitor and an aqueous suspension of hydrated lime into a first reaction zone wherein the hydrogen peroxide and the hydrated lime combine in the presence of the added phosphate ion progenitor to form solid calcium peroxide octahydrate; separating the solid calcium peroxide octahydrate from the mother liquor, slurrying the separated calcium peroxide octahydrate in one of the group consisting of water and aqueous solutions of hydrogen peroxide; passing a continuous stream of the slurry of calcium peroxide hydrate into a second reaction zone wherein there is maintained a substantially constant temperature between about 40° C. and about 65° C. and a substantially constant carbon dioxide pressure between about 200 and about 500 pounds per square inch for a predetermined time of residence within said second reaction zone greater than that certain residence time at which the numerical value of the differential $dc/dt$, $c$ being the percentage decomposition to non-peroxygen products of the active oxygen contained in the feed to said second reaction zone as the residence time, $t$, of the slurry therewithin is varied, passes through zero from positive to negative values, but not over about 20 minutes; withdrawing a slurry comprising solid calcium carbonate suspended in an aqueous solution of hydrogen peroxide from said second reaction zone; separating the solid calcium carbonate from the aqueous solution of hydrogen peroxide; and contacting the aqueous solution of hydrogen peroxide with a synthetic cation-exchange resin substantially in the hydrogen form.

5. A continuous process for the purification of hydrogen peroxide which comprises: adding to an impure aqueous solution of hydrogen peroxide from about 0.05% to about 10% by weight of the hydrogen peroxide of a water-soluble ionizable compound which yields phosphate ion upon solution in water selected from the class consisting of the hydrates of $P_2O_5$ and the water-soluble mineral salts of said hydrates; introducing the solution of hydrogen peroxide containing said added water-soluble ionizable compound at a hydrogen peroxide concentration of about 0.5% to 25% by weight and an aqueous slurry of finely particulate hydrated calcined limestone into a first reaction zone wherein the hydrogen peroxide and the hydrated calcined limestone combine to form solid calcium peroxide octahydrate; separating the solid calcium peroxide octahydrate from the mother liquor and forming an aqueous slurry of the separated solid calcium peroxide octahydrate; introducing a continuous stream of the aqueous slurry of the separated calcium peroxide octahydrate into a second reaction zone wherein there is maintained a substantially constant temperature of between about 40° C. and about 65° C. and a substantially constant carbon dioxide pressure between about 200 and about 500 pounds per square inch for a predetermined time of residence within said second reaction zone between about 2 and about 6 times the length of that certain residence time at which the numerical value of the differential $dc/dt$ passed through zero from positive to negative values, $c$ being the percentage decomposition to non-peroxygen products of the active oxygen contained in the feed to said second reaction zone as the residence time, $t$, of the slurry therewithin is varied, and withdrawing from said second reaction zone a slurry of solid calcium carbonate suspended in an aqueous solution of hydrogen peroxide.

6. A process for the preparation of calcium peroxide which comprises effecting reaction between hydrogen peroxide in aqueous solution and calcium hydroxide in aqueous suspension in the presence of a phosphate ion.

7. A process for the preparation of calcium peroxide which comprises effecting reaction between hydrogen peroxide in aqueous solution and calcium hydroxide in aqueous suspension in the presence of from about 0.05% to about 10% by weight of the hydrogen peroxide of a phosphate ion.

8. The method of producing solid calcium peroxide octahydrate which comprises adding to an about 1% to 25% by weight aqueous solution of hydrogen peroxide from about 0.05% to about 10% by weight of the hydrogen peroxide of a phosphate ion progenitor and mixing the aqueous solution of hydrogen peroxide containing the added phosphate ion progenitor with an aqueous slurry of calcium hydroxide to form solid calcium peroxide octahydrate.

9. The method of producing solid calcium peroxide octahydrate which comprises adding to an about 0.5% to 25% by weight aqueous solution of hydrogen peroxide from about 0.05% to about 10% by weight of the hydrogen peroxide of a water-soluble ionizable compound which yields a phosphate ion upon solution in water selected from the class consisting of the hydrates of $P_2O_5$ and the water-soluble mineral salts of said hydrates and mixing together the aqueous solution of hydrogen peroxide containing said water-soluble ionizable compound and an aqueous slurry comprising calcium hydroxide suspended in water to form solid calcium peroxide octahydrate.

10. A process for the generation of hydrogen peroxide from solid calcium peroxide containing ferriferous impurities which comprises progressively introducing an aqueous slurry of the solid calcium peroxide containing ferriferous impurities into a confined reaction zone wherein there is maintained a substantially constant temperature within the range of from about 30° C. to about 80° C. and a substantially constant carbon dioxide pressure greater than about 100 pounds per square inch for a predetermined time of residence within said zone between about 2 and about 6 times the length of that certain residence time at which the numerical value of the differential $dc/dt$ passes through zero from positive to negative values, $c$ being the percentage decomposition to non-peroxygen products of the active oxygen contained in the slurry as the residence time, $t$, of the slurry within the reaction zone is varied, but not over about 20 minutes, and withdrawing from the reaction zone a slurry of solid calcium carbonate in an aqueous solution of hydrogen peroxide.

11. A process for the generation of hydrogen peroxide from solid calcium peroxide containing ferriferous impurities which comprises introducing a continuous stream of an aqueous slurry of the solid calcium peroxide containing ferriferous impurities into a confined reaction zone wherein there is maintained a temperature of from about 40° C. to about 65° C. and a carbon dioxide pressure between about 200 and about 500 pounds per square inch at a rate of introduction equivalent to a residence time of the slurry within the reaction zone between about 2 and about 6 times the length of that certain residence time at which the numerical value of the differential $dc/dt$ passes through zero from positive to negative values, $c$ being the percentage decomposition to non-peroxygen products of the active oxygen contained in the slurry as the residence time, $t$, of the slurry in said reaction zone is varied, and withdrawing a slurry of solid calcium carbonate in an aqueous solution of hydrogen peroxide from the reaction zone.

12. A process for the generation of hydrogen peroxide from solid calcium peroxide containing ferriferous impurities which comprises passing a continuous stream of an aqueous slurry of solid calcium peroxide containing ferriferous impurities into a confined reaction zone wherein there is maintained a temperature of from about 30° C. to about 80° C. and a carbon dioxide pressure between about 100 and about 1000 pounds per square inch at a rate equivalent to a residence time greater than a minimum time varying inversely according to the temperature between about 6 minutes and about ½ minute, the 6-minute minimum time applying at the limit defined by the lower of said temperatures and the ½-minute minimum time applying at the limit defined by the higher of said temperatures, but for a residence time not greater than about 20 minutes, and withdrawing a slurry of solid calcium carbonate in an aqueous solution of hydrogen peroxide from the reaction zone.

13. A process for the generation of hydrogen peroxide from solid calcium peroxide containing ferriferous impurities which comprises passing a stream of an aqueous slurry initially of the solid cacium peroxide containing ferriferous impurities into a confined reaction zone wherein there is provided vigorous agitation of the slurry and there is maintained a temperature of from about 30° C. to about 80° C. and a carbon dioxide pressure between about 100 and about 1000 pounds per square inch for a residence time, within the range of from about ½ minute to about 20 minutes, greater than that certain residence time within said range at which under the operating conditions the numerical value of the differential $dc/dt$ passes through zero from positive to negative numerical values, in said differential $c$ being the percentage decomposition to non-peroxygen products of the active oxygen initially present in the slurry as the residence time, $t$, of the slurry within the reaction zone is varied, and continuously withdrawing from said confined reaction zone an aqueous slurry comprising solid calcium carbonate suspended in an aqueous solution of hydrogen peroxide.

References Cited in the file of this patent

UNITED STATES PATENTS

| Number | Name | Date |
|---|---|---|
| 1,235,664 | Doerner | Aug. 7, 1917 |
| 2,497,810 | Campbell et al. | Feb. 14, 1950 |

FOREIGN PATENTS

| Number | Country | Date |
|---|---|---|
| 3,628 of 1890 | Great Britain | Feb. 14, 1891 |